US012766389B2

(12) United States Patent
Li

(10) Patent No.: US 12,766,389 B2
(45) Date of Patent: Oct. 20, 2026

(54) CREATIVE LIGHT-EMITTING RACKET

(71) Applicant: Banglin Li, Shenzhen (CN)

(72) Inventor: Banglin Li, Shenzhen (CN)

( * ) Notice: Subject to any disclaimer, the term of this patent is extended or adjusted under 35 U.S.C. 154(b) by 329 days.

(21) Appl. No.: 18/409,678

(22) Filed: Jan. 10, 2024

(65) Prior Publication Data

US 2024/0149122 A1 May 9, 2024

(30) Foreign Application Priority Data

Dec. 2, 2023 (CN) ......................... 202323317812.2

(51) Int. Cl.

| | |
|---|---|
| ***A63B 59/42*** | (2015.01) |
| ***A63B 60/06*** | (2015.01) |
| ***F21L 4/08*** | (2006.01) |
| ***F21V 23/00*** | (2015.01) |
| ***F21V 23/04*** | (2006.01) |
| ***F21V 33/00*** | (2006.01) |
| ***F21Y 105/12*** | (2016.01) |
| ***F21Y 113/13*** | (2016.01) |

(52) U.S. Cl.
CPC .............. *A63B 59/42* (2015.10); *A63B 60/06* (2015.10); *F21L 4/08* (2013.01); *F21V 23/009* (2013.01); *F21V 23/0421* (2013.01); *F21V 33/008* (2013.01); *A63B 2225/74* (2020.08); *F21Y 2105/12* (2016.08); *F21Y 2113/13* (2016.08)

(58) Field of Classification Search
CPC ............................ A63B 59/42; A63B 2225/74
See application file for complete search history.

(56) References Cited

U.S. PATENT DOCUMENTS

2016/0243416 A1* 8/2016 Apatini .................. G06V 40/23
2024/0226677 A1* 7/2024 Matt ...................... A63B 43/06

FOREIGN PATENT DOCUMENTS

EP 1886715 A1 * 2/2008 ............. A63B 49/08

* cited by examiner

*Primary Examiner* — Brian O Peters

(57) ABSTRACT

Disclosed is a creative light-emitting racket, including a plate body and a grip, the grip is fixedly installed beneath the plate body, a set of or a plurality of sets of slots with a certain depth are formed on the plate body, and the slots are formed to be slots of any shapes or slot holes of any shapes penetrating the plate body; and adapted light-emitting members are installed inside the slots, and a plurality of lamp beads are arranged on the light-emitting members.

9 Claims, 4 Drawing Sheets

CREATIVE LIGHT-EMITTING RACKET

TECHNICAL FIELD

The present disclosure relates to the technical field of sports equipment, and more particularly to a creative light-emitting racket.

BACKGROUND

With the improvement of living standards, people pay increasing attention to their health. Tennis and pickleball are popular sports, and rackets are indispensable equipment for playing tennis, pickleball and other sports. A racket is a tool used for playing a ball and consists of a racket surface, a grip, and the like.

However, when being used, the racket can only assist people in playing the ball, offering a relatively single function and effect, without creating good user experience. Therefore, it is necessary to design a creative light-emitting racket to make the racket more awesome during use.

SUMMARY

In order to overcome the above defects in the prior art, the present disclosure provides a creative light-emitting racket to solve the problems mentioned in the background art.

In order to achieve the above objective, the present disclosure provides a creative light-emitting racket, including a plate body and a grip, the grip is fixedly installed beneath the plate body, a set of or a plurality of sets of slots with a certain depth are formed on the plate body, and the slots are formed to be slots of any shapes or slot holes of any shapes penetrating the plate body; and adapted light-emitting members are installed inside the slots, and a plurality of lamp beads are arranged on the light-emitting members.

As a further improved technical solution of the present disclosure, a battery is arranged inside the grip, a circuit board is arranged on one side of the battery, and a functional switch is embedded in the grip or the plate body for control.

As a further improved technical solution of the present disclosure, the battery and the light-emitting members are electrically connected to the circuit board.

As a further improved technical solution of the present disclosure, a charging socket is formed on the circuit board, and the charging socket penetrates the corresponding grip.

As a further improved technical solution of the present disclosure, a light control chip is arranged on the circuit board, and the lamp beads on the light-emitting members can be controlled through the light control chip.

As a further improved technical solution of the present disclosure, the lamp beads are specifically configured as single-color lamp beads or multi-color lamp beads.

As a further improved technical solution of the present disclosure, the slots on the plate body can be arranged on an either side or both sides of the plate body.

As a further improved technical solution of the present disclosure, the slots can be configured as character- or letter-shaped slots, heart-shaped slots, flower-shaped slots or star-shaped slots.

As a further improved technical solution of the present disclosure, an adapted light-transmitting panel is arranged on the plate body.

The present disclosure has the beneficial technical effects and advantages:

1. In the present disclosure, slots are formed on both front and back sides or an either side of the racket, the slots can be slots of any shapes, such as character- or letter-shaped slots, heart-shaped slots, flower-shaped slots or star-shaped slots, and adapted light-emitting members are mounted inside the slots. After the light-emitting members are lighted up, the racket will shine and shapes of the light source are the shapes of the slots, making the racket very beautiful and awesome.

2. In the present disclosure, the light-emitting members are provided with single-color lamp beads or multi-color lamp beads, a light control chip is arranged on the circuit board, and brightness and colors of the light can be adjusted through the switch, making it highly practical.

Figure 1:
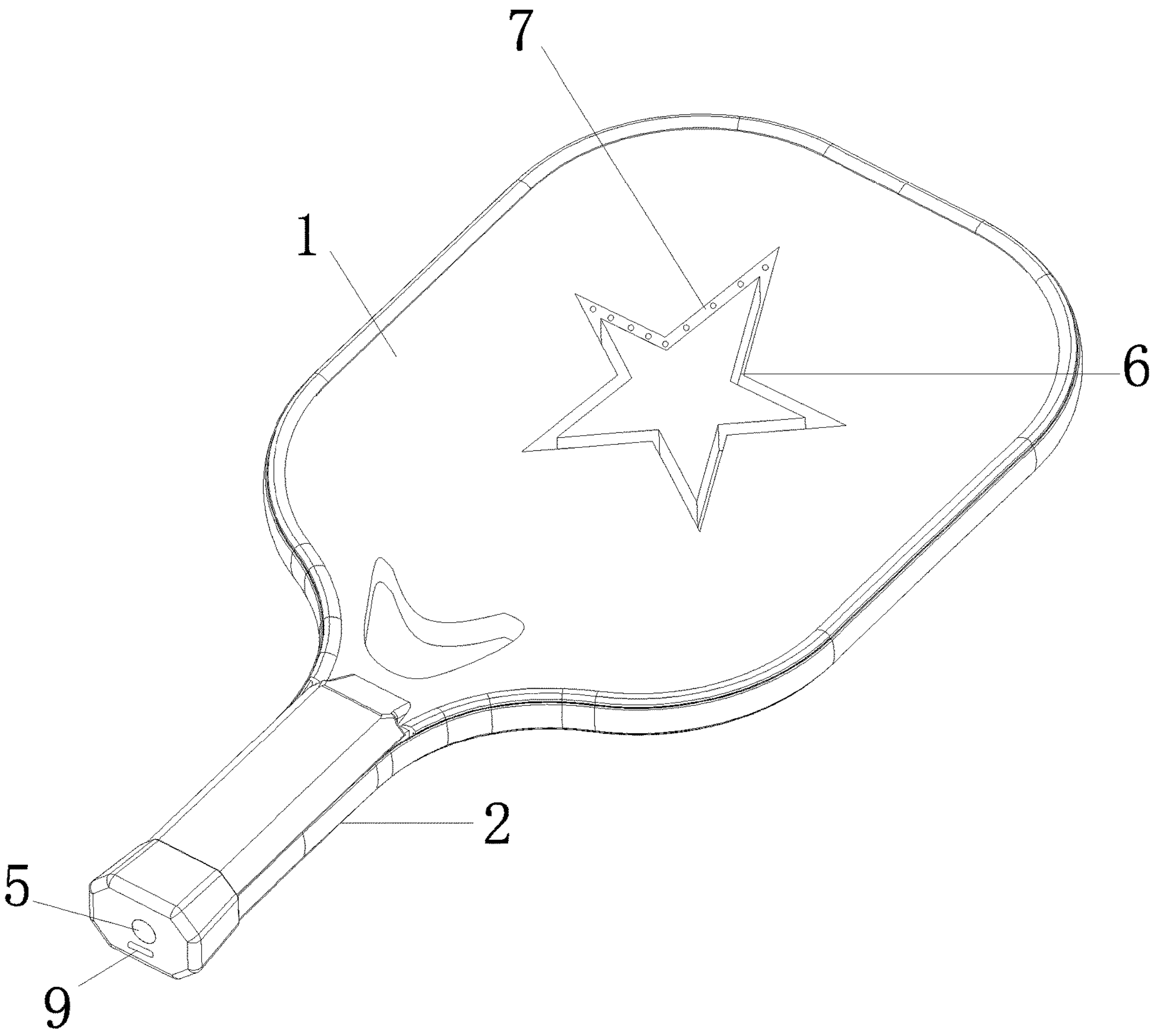
FIG. 1 is an overall structural schematic diagram of Embodiment 1 of the present disclosure.

Reference numerals in the drawings: 1. plate body; 2. grip; 3. battery; 4. circuit board; 5. functional switch; 6. slot; 7. light-emitting member; 8. lamp bead; and 9. charging socket.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

Embodiment 1

Figure 2:
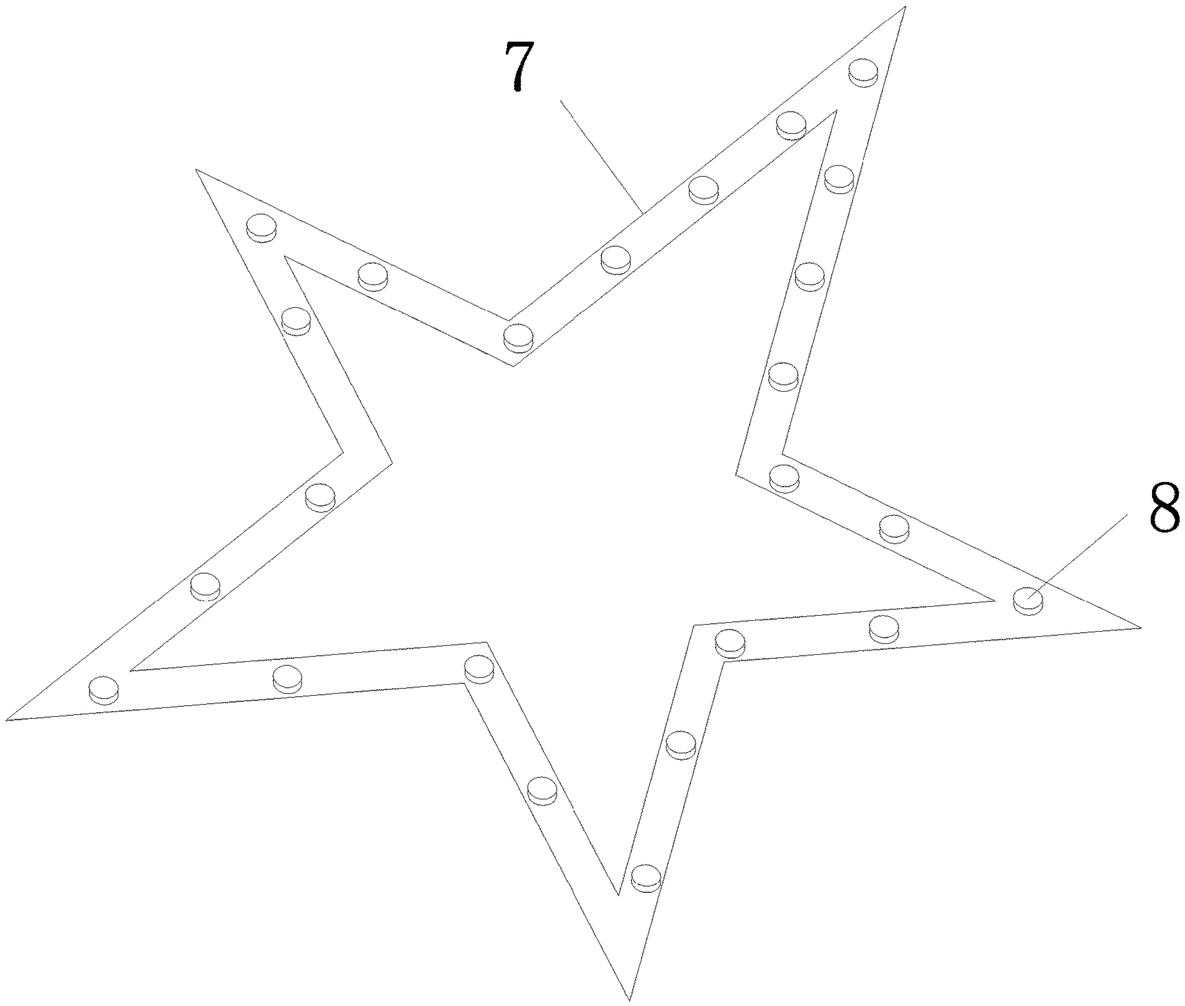
FIG. 2 is a structural schematic diagram of a light-emitting member in Embodiment 1 of the present disclosure.
Figure 3:
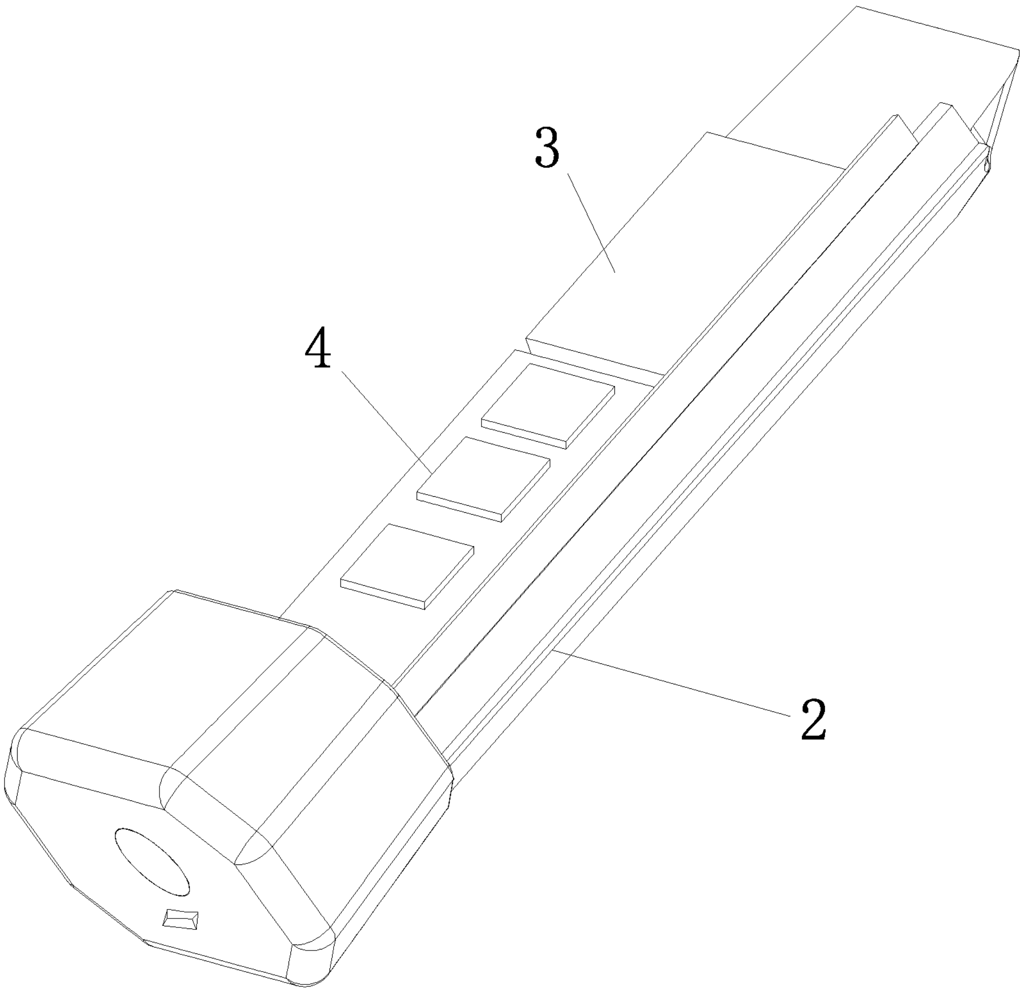
FIG. 3 is a structural schematic diagram of a grip, a battery and a circuit board in Embodiment 1 of the present disclosure.

A creative light-emitting racket, as shown in FIGS. 1-3, includes a plate body 1, a grip 2, a battery 3, a circuit board 4, a functional switch 5, slots 6, light-emitting members 7 and lamp beads 8, where the grip 2 is fixedly installed beneath the plate body 1, a set of or a plurality of sets of slots 6 with a certain depth are formed on the plate body 1, and the slots 6 are formed to be slots of any shapes or slot holes of any shapes penetrating the plate body 1; the adapted light-emitting members 7 are installed inside the slots 6, the light-emitting members 7 can be fixed in the middle of the slots 6 or embedded on side walls of the slots 6 through glue, the light-emitting members 7 are combined into light sources of different shapes along the slots 6 of different shapes, the light-emitting members 7 can be spliced together by one or more strips, a plurality of lamp beads 8 are arranged on the light-emitting members 7, and the light-emitting members 7 are configured as flexible light strips, light strings, or light panels.

As shown in FIG. 1, the slots 6 are slots of any shapes with a certain depth, the light-emitting members 7 are laid flat inside the slots 6, and the lamp beads 8 on the light-emitting members 7 emit light outwards.

In some embodiments, as shown in FIGS. 1-3, the battery 3 is arranged inside the grip 2, the battery 3 can be a rechargeable lithium battery, the circuit board 4 is arranged on one side of the battery 3, the functional switch 5 is embedded in the grip 2 or the plate body 1 for control, the functional switch 5 is electrically connected to the circuit board 4, and the functional switch 5 is specifically a touch switch, a button switch, a toggle switch, or the like. In this embodiment, the functional switch 5 is arranged on a bottom surface of the grip 2 or on an either side of the grip 2, the functional switch 5 is configured as a touch switch to improve the waterproof performance of the product, the battery 3 and the light-emitting members 7 are electrically connected to the circuit board 4, a charging socket 9 is formed on the circuit board 4, the charging socket 9 is arranged on a side of the functional switch 5, the charging socket 9 penetrates the corresponding grip 2, the charging socket 9 is used to charge the battery 3, a light control chip is arranged on the circuit board 4, the lamp beads 8 on the light-emitting members 7 can be controlled through the light control chip, the lamp beads 8 are specifically configured as single-color lamp beads or multi-color lamp beads, brightness of the lamp beads 8 can be adjusted by setting the light control chip, and when the multi-color lamp beads 8 are configured as the multi-color lamp beads, colors of the lamp beads 8 can be switched, making the racket during use more beautiful and awesome.

In some embodiments, as shown in FIGS. 1-3, the slots 6 on the plate body 1 can be arranged on an either side or both sides of the plate body 1. When the slots 6 are formed on the front side or the back side, only one side emits light; when the slots 6 are formed on the front side or the back side of the plate body 1, two sides of the plate body 1 emit light.

In some embodiments, as shown in FIGS. 1-3, the slots 6 can be configured as heart-shaped, flower-shaped, or star-shaped slots. when the slots 6 are formed on both the front side or the back side of the plate body 1, the slots 6 can be configured as character- or letter-shaped slots, heart-shaped slots, flower-shaped slots or star-shaped slots, or can be slots of any shapes, the light-emitting members 7 inside the slots are combined or spliced together by a plurality of strips light-emitting members, or a single strip of light-emitting member 7 is configured to form a light source shape along the slots 6, producing an aesthetically pleasing effect after being lighted up;

in such a way, when the slots 6 are formed on both the front side and the back side of the plate body 1, the slots 6 on the front and back sides can be configured as the slots of the same shape, or the slots 6 on the front and back sides can be configured as different shapes, so that different light-emitting effects can be achieved and various creative light-emitting patterns can be met, making the racket awesome; and the slots 6 can penetrate the plate body 1, the light-emitting members 7 are configured to emit light from both sides, and the light-emitting members 7 are fixed on the plate body 1 with glue, so that both sides of the plate body 1 can emit light simultaneously.

Embodiment 2

Figure 4:
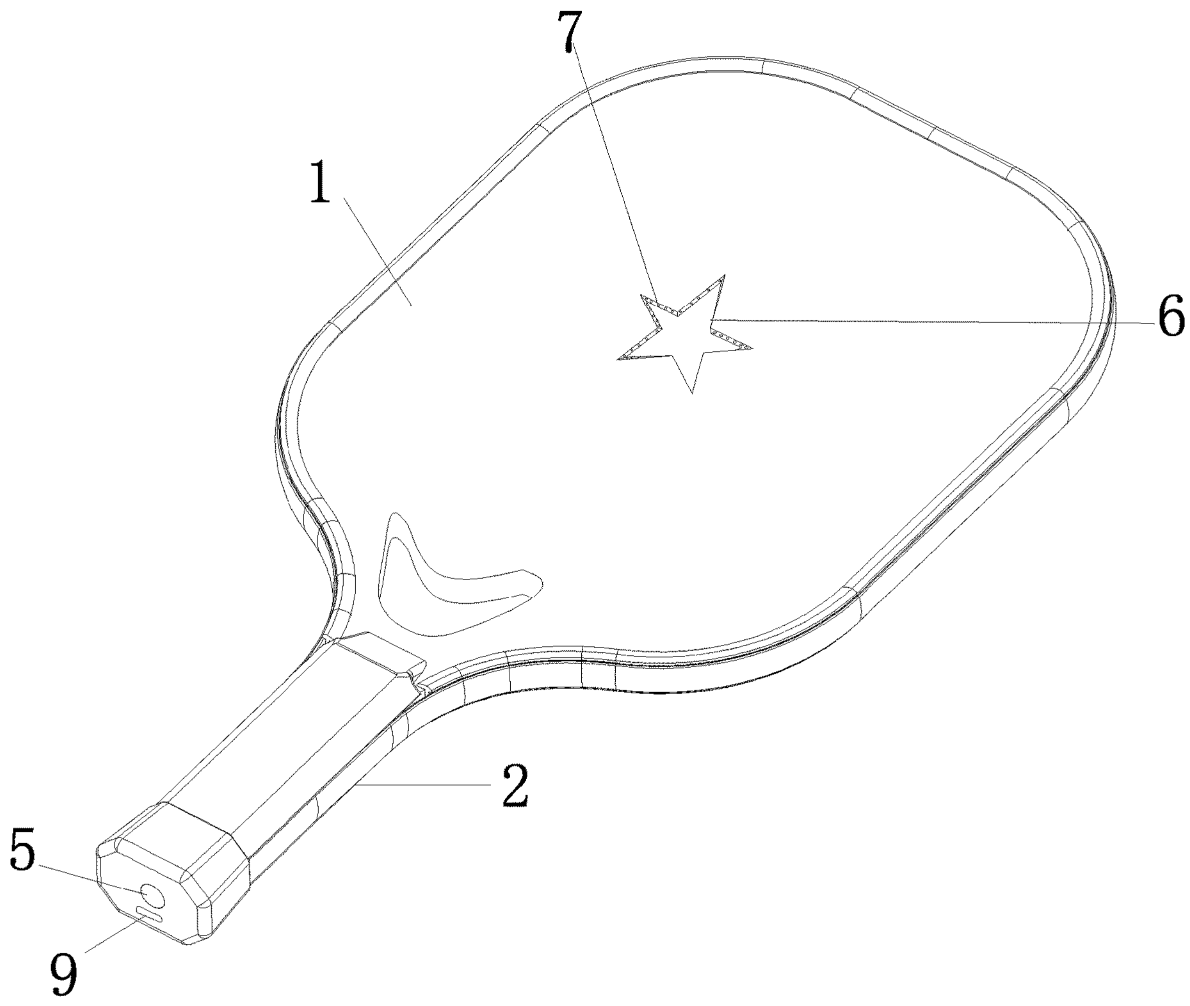
FIG. 4 is an overall structural schematic diagram of Embodiment 2 of the present disclosure.

As shown in FIG. 4, slots 6 are slot holes of any shapes penetrating a plate body 1, light-emitting members 7 are embedded and surrounded on an either side wall or both side walls of the slots along the shapes of the slots holes, and a light-emitting direction of lamp beads 8 on the light-emitting members 7 emit light in a direction is the side wall of the opposite slot holes.

In other embodiments, the plate body 1 is provided with an adapted light-transmitting panel, the light-transmitting panel can be mounted on the front side and the back side of the plate body 1, the light-transmitting panel can also be mounted on the front side or the back side of the plate body 1, light emitted from lamp beads 8 shines on the light-transmitting panel, the light-transmitting panel can be configured to be light-transmitting, semi-light-transmitting or fully light-transmitting, and the light-transmitting panel can be made of plastic or light-transmitting fiberglass materials. It should be noted that the light-transmitting panel is an optional accessory. By setting the light-transmitting panel, the racket can adapt to different lighting effects.

In such a way, the light-transmitting panel is snap-fitted on the plate body 1 or fixed to the plate body with glue, thereby increasing the airtightness of the internal light source and facilitating waterproofing.

Working principles of the present disclosure are as follows:

The present disclosure includes a plate body 1 and a grip 2, a battery 3 and a circuit board 4 are arranged inside the grip 2, the grip 2 is further provided with a functional switch 5, the plate body 1 is fixedly connected to the upper portion of the grip 2, at least a set of or a plurality of sets of slots 6 are formed on the plate body 1, the slots 6 are formed on the front side or the back side of the plate body 1, or on both the front side or the back side of the plate body, light-emitting members 7 are laid flat inside the slots 6, the light-emitting members 7 are combined to form a light-emitting source of a certain shape, the light-emitting members 7 are provided with single-color lamp beads or multi-color lamp beads and will display a preset shape after being lighted up, and the light-emitting shape is consistent with shapes of the slots 6, making the racket very beautiful and awesome.

Specifically, the battery 3 and the light-emitting members 7 are electrically connected to the circuit board 4; a charging socket 9 is formed on the circuit board 4, and the charging socket 9 penetrates the corresponding grip 2; a light control chip is arranged on the circuit board 4, and the lamp beads 8 on the light-emitting members 7 can be controlled through the light control chip, such that brightness and color modes of the lamp bead can be switched. The control technology is an existing technical means and does not need to be described in detail, and the overall power supply and control are accordingly implemented.

In the accompanying drawings of the embodiments disclosed in the present disclosure, only the structures related to the disclosed embodiments are provided, and other structures can refer to the usual design. Under the condition of having no conflict, the same embodiments and different embodiments of the present disclosure can be combined with one another.

The foregoing descriptions are merely exemplary embodiments of the present disclosure, and not intended to limit the present disclosure. Any modifications, equivalent substitutions, and improvements made within the spirit and principle of the present disclosure shall fall within the protection scope of the present disclosure.

What it claimed is:

1. A creative light-emitting racket, comprising: a plate body and a grip, wherein the grip is fixedly installed beneath the plate body, a set of or a plurality of sets of slots are formed on the plate body, and the slots are formed to be slots of any shapes or slot holes of any shapes penetrating the plate body; and adapted light-emitting members are installed inside the slots, and a plurality of lamp beads are arranged on the light-emitting members;

wherein the light-emitting elements are flexible light strips, light strings, or light panels;

a functional switch is embedded in the grip or the plate body for control;

wherein the functional switch is a touch switch, a button switch or a toggle switch.

2. The creative light-emitting racket according to claim 1, wherein a battery is arranged inside the grip, a circuit board is arranged on one side of the battery.

3. The creative light-emitting racket according to claim 2, wherein the battery and the light-emitting members are electrically connected to the circuit board.

4. The creative light-emitting racket according to claim 2, wherein a charging socket is formed on the circuit board, and the charging socket penetrates the corresponding grip.

5. The creative light-emitting racket according to claim 2, wherein a light control chip is arranged on the circuit board, and the lamp beads on the light-emitting members are configured to be controlled through the light control chip.

6. The creative light-emitting racket according to claim 1, wherein the lamp beads are specifically configured as single-color lamp beads or multi-color lamp beads.

7. The creative light-emitting racket according to claim 1, wherein the slots on the plate body are configured to be arranged on either one side or both sides of the plate body.

8. The creative light-emitting racket according to claim 1, wherein the slots are configured to be configured as character- or letter-shaped slots, heart-shaped slots, flower-shaped slots or star-shaped slots.

9. The creative light-emitting racket according to claim 1, wherein an adapted light-transmitting panel is arranged on the plate body.

* * * * *